United States Patent
Schwab et al.

[15] 3,635,445

[45] Jan. 18, 1972

[54] WORM-TYPE CONVEYOR MIXER

[72] Inventors: Johann Schwab; Walter Putz, both of Vienna, Austria

[73] Assignee: Semperit Oesterreichisch-Amerikamsch Gummiwerke Aktiengesellschaft, Vienna, Austria

[22] Filed: Nov. 12, 1968

[21] Appl. No.: 774,784

[30] Foreign Application Priority Data

Nov. 13, 1967 Austria..........................10229/67

[52] U.S. Cl. ................................259/22, 259/9, 18/12
[51] Int. Cl.....................B01f 7/02, B01f 15/02, B29f 3/02
[58] Field of Search..........................259/22, 23, 25, 26, 9; 18/12 SH, 12 G, 12 A

[56] References Cited

UNITED STATES PATENTS

| 3,164,375 | 1/1965 | Frenkel.............................259/9 X |
| 3,062,512 | 11/1962 | Carter................................259/25 |
| 3,148,412 | 9/1964 | Spreeuwers.....................259/22 X |
| 3,392,962 | 7/1968 | Fritsch et al......................259/9 |
| 3,477,698 | 11/1969 | Smith et al......................259/25 |

FOREIGN PATENTS OR APPLICATIONS

| 528,792 | 8/1956 | Canada..............................259/9 |
| 749,957 | 6/1956 | Great Britain...................259/25 |
| 52,060 | 8/1936 | Denmark........................259/9 |
| 1,102,873 | 5/1955 | France..............................259/9 |

*Primary Examiner*—James Kee Chi
*Attorney*—Ernest F. Marmorek

[57] ABSTRACT

A worm-type conveyor mixer disposed in a mixing chamber and having threadlike convolution formed thereon with a working surface between adjacent crest portions, the worm-type conveyor mixer tapering in the direction of material flow.

8 Claims, 2 Drawing Figures

INVENTORS
JOHANN SCHWAB,
WALTER PUTZ

WORM-TYPE CONVEYOR MIXER

The present invention relates generally to a mixing apparatus, and more particularly it relates to worm-type conveyor mixer apparatus.

In recent time plastic materials are manufactured, with increasing frequency, from the mixture of fluid base materials. It becomes, therefore, important to be able to continuously introduce two or more components into a mixing chamber and, after their good mixing, to remove them from the chamber such as by injecting them into forms or by pouring them over trays or conveyor belts.

As a result, it become necessary to provide the mixing chamber with a mixer which is not only in the position to perform the necessary mixing of two or more components, but also to inject the mixed material under certain pressure into a form. Furthermore, during operation and as well as during the idling of the mixer during which the mixer keeps rotating at idle speed, care should be taken to avoid settling of the mixed material and thereby jamming the mixer within the chamber.

The quick and good mixing of the materials under a sufficient pressure affording good subsequent transport of the mixed materials is in conflict with the requirements of mixing several components.

In known injection molding machines, worm-type conveyors are used for transport of the materials which are provided with threadlike turns having steep edges pointing in the direction of the material flow and which quickly engage the material introduced into the mixing chamber and transport it forward under high pressure. The mixing effect under these conditions, when two or more components are to be mixed under pressure, has been found to be very poor. This is more so, since the distance between the worm-type mixer and the housing wall is selected to be very minute in order to prevent a buildup of the synthetic material on the walls of the mixing chamber which could cause jamming of the mixer.

It is therefore, an object of the present invention to provide an improved mixing apparatus which eliminates the drawback of prior art devices.

It is another object of the present invention to provide a mixing apparatus having a worm-type conveyor which, in accordance with the present invention, is capable of transporting synthetic materials under high pressure and at high revolutions without allowing for forming of depositions on the walls of the mixing chamber.

In accordance with the invention a mixing apparatus is provided for the mixing of at least two different synthetic resins and in which a worm-type conveyor mixer is placed in a mixing chamber, the worm-type mixer having a threadlike convolution formed thereon and a working surface formed between adjacent crest portions and structured to taper over at least 50 percent of the distance between the adjacent crest portions.

The invention also provides for the tapering of the worm-type conveyor mixer in the direction of the material flow.

The invention will become more readily apparent from the following description of a preferred embodiment thereof shown, by way of example, in the accompanying drawing in which.

Figure 1:
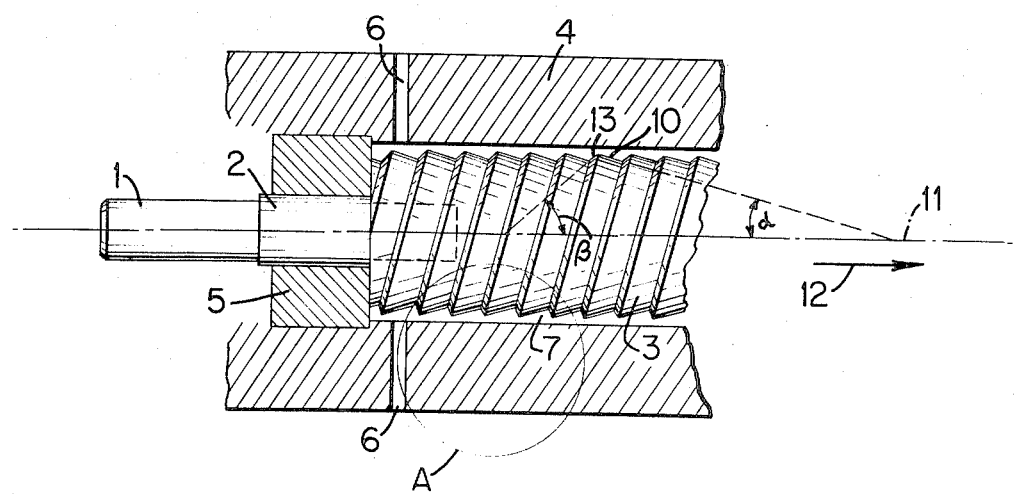
FIG. 1 is a fragmentary side elevational view in section of a mixing chamber with a worm-type mixer therein in accordance with the present invention.

With reference to the Figures it is seen that the conveyor apparatus consists of an axle 1 having an imaginary axis 11 and having a bearing seat 2 thereon and a worm-type conveyor 3 which is fixedly connected, such as by welding, or other methods, to axle 1. The worm-type conveyor is placed into a mixing chamber 7, of a mixing apparatus 4, in which it is accurately guided by being supported in a bearing 5.

The mixing chamber is provided with a pair of inlet ports 6 for the introduction of the components to be mixed which, in the exemplary embodiment shown, in FIG. 1 is illustrated as being two. It is, however, understood that several components can be mixed with the present mixing apparatus 4 and according to the number of components to be mixed corresponding number of inlet ports 6 should be provided. The sealing of mixing chamber 7 is attained by press fitting the worm-type mixer 3 on the sidewall of the bearing, as well as by the accurate fitting of the bearing bushing 2 into its seat. Mixing chamber 7 of mixing apparatus 4 is cylindrical and is manufactured with close tolerances. In the neighborhood of inlet ports 6 the mixer 3 has relative to the diameter of the mixer a very small clearance as shown at 8, which is preferably in the range of 0.05–0.01 mm. Such small clearance is necessary in order to provide a quick carrying away of the material from the region of the inlet ports and, in order to prevent the formation of a skinlike settlement on the walls of the mixing chamber. From this point on the diameter of the worm-type conveyor is reduced by about 3–10 percent by preferably removing material from the crest portion 9 whereupon in the region following the inlet ports in the direction of the material flow 12, the mixing effect will be improved.

Figure 2:
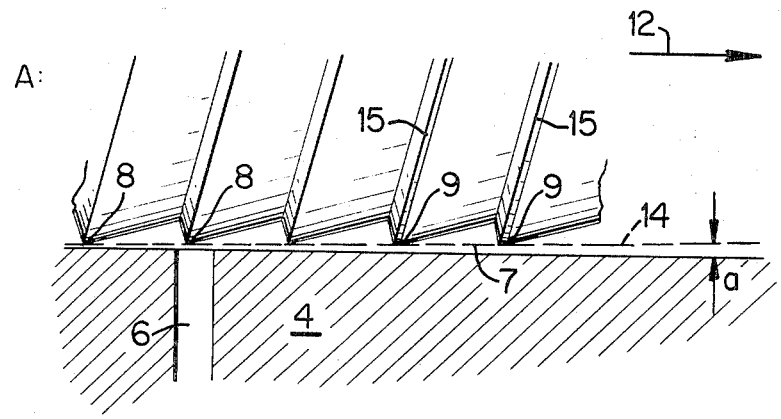
FIG. 2 is an enlarged view of the parts encircled at A in FIG. 1.

The material will be quickly removed from the region of the inlet ports 6 but not removed at the same rate from the succeeding regions. Instead, the material will be guided which guiding process is conditioned on the high revolution of mixer 3 and transferred from pitch to pitch and will be very thoroughly mixed. It is very advantageous if the tapering of the worm-type conveyor is continuous, which results in a slight taper thereof with respect to chamber 7 as seen by the broken line 14 and the increased distance $a$ (FIG. 2). Preferably, the spacing of successful outside crest surface 9 of the worm-type mixer from the wall portions of the chamber 7 increases by about 3 mm., in the direction of the material flow 12 in the case of a worm-type mixer having an outer diameter of about 18 mm.

The worm-type mixer 3 possesses a convolution having crest portions which are connected by a working surface, having flanks 10, 13 and 15, which, as pointed out above, tapers in the direction of the material flow over at least 50 percent of the distance between adjacent crest portions. Alpha ($\alpha$) represents the angle of the flank 13, while beta ($\beta$) is the angle of the flank 10.

As a result of this reversed tapering of the working surface and of the entire worm-type mixer 3 and by the fact that the flat crest of each pitch is pointed in the direction of the material flow 12, the mixing effect of the mixer is considerably improved since the material becomes masticated between the chamber wall and the continuously tapering surface of the worm-type mixer unlike in the prior art devices, in which a steep edge quickly engages the material and forces it constantly forward.

The mixing effect is further improved in that the distance of the upper surface of the worm-type mixer from the wall of the chamber is increased which has its effect on the desired transporting pressure. In accordance with the invention the upper surface of the worm-type mixer is placed from the wall of the chamber at the inlet ports at a distance of less than 0.1 mm., preferably less than 0.05 mm., while such distance is increased by about 1/20–1/60 of the diameter of the worm-type mixer at points away from the inlet port. As a result, the material is quickly engaged at the inlet ports and pressed forwardly. However, an improved mixing effect takes place by conveying the material from pitch to pitch by the working surface of each pitch and the flow is improved by the tapering effect of the worm-type conveyor, that is by the increasing distance of subsequent crest portions from the wall chambers.

It has been found that the pressure within the mixing chamber is satisfactory and meets the requirements of the injection process in all respects. The mixing effect as well as the pressure required for the injection process can be regulated also by a corresponding selection of the number of revolutions of the mixer. It has been found that instead of using the usual number of revolutions of prior art devices which was about 2,000 per minute, the worm-type conveyor mixer of the present invention can be advantageously operated at revolutions of 8–10,000 per minute.

From the above it will be apparent that this invention provides a novel mixing apparatus which fulfills all of the objects for the invention. While the invention has been shown and described with reference to a preferred embodiment thereof, of course, it will be obvious to those skilled in the art that the invention will find applications in connection with many types of mixing apparatus other than that shown, Thus it will be apparent that the invention is not to be considered as limited by the drawing and description but only as to its spirit and scope as it is set forth in the appended claims.

We wish it to be understood that we do not desire to be limited to the exact details of construction shown and described, for obvious modifications will occur to a person skilled in the art.

We claim:

1. In an apparatus for mixing together at least two different synthetic resins, a housing having wall portions forming a mixing chamber and defining at least one material inlet port leading to said chamber, a worm-type conveyor mixer disposed in said mixing chamber and having an enveloping surface spaced apart for a distance from the wall portions of said housing, said distance from the wall portions of said housing, said distance increasing in the direction of material flow.

2. An apparatus as claimed in claim 1, wherein said housing defines at least a pair of material inlet ports leading into said mixing chamber, the crest portion adjacent said material inlet ports being spaced for a distance of less than 0.1 mm. from said housing wall portion and the distance from the wall portion of the adjacent crest portion in the direction of the material flow increasing by approximately 1/20 of the crest diameter of said mixer conveyor.

3. An apparatus as claimed in claim 1, wherein said housing defines at least a pair of material inlet ports leading into said mixing chamber, the crest portion adjacent said material inlet ports is spaced for a distance of less than 0.05 mm. from said housing wall portion and the distance of the adjacent crest portion in the direction of the material flow increases by approximately from about 1/20 to about 1/60 of the crest diameter of said mixer conveyor.

4. An apparatus as claimed in claim 1, wherein said conveyor mixer rotates at a speed of about 8–10,000 r.p.m.

5. In an apparatus for mixing together at least two different synthetic resins, a housing having wall portions forming a mixing chamber and defining at least one material inlet port leading to said chamber, a worm-type conveyor mixer disposed in said mixing chamber and spaced apart for a distance from the wall portions of said housing and having at least two convoluting flank surfaces at an angle to each other and both inclined with relation to the direction of material flow, one of said surfaces facing towards said direction and forming with said direction a smaller angle than the other surface.

6. In an apparatus, as claimed in claim 5, said distance increasing in said direction.

7. In an apparatus, as claimed in claim 5, and an intermediate third flank surface between said two throughout at least a portion of said mixture.

8. In an apparatus, as claimed in claim 1, said mixer having two convoluting flank surfaces at an angle to each other and both inclined with relation to the direction of material flow and a third throughout at least a portion of said mixer, and increasing in width in said direction.

* * * * *